Nov. 3, 1959
J. H. WILSON
2,911,193
INDIVIDUAL POWER DRIVE UNIT FOR ROTARY TABLES
Filed March 28, 1955
4 Sheets-Sheet 1
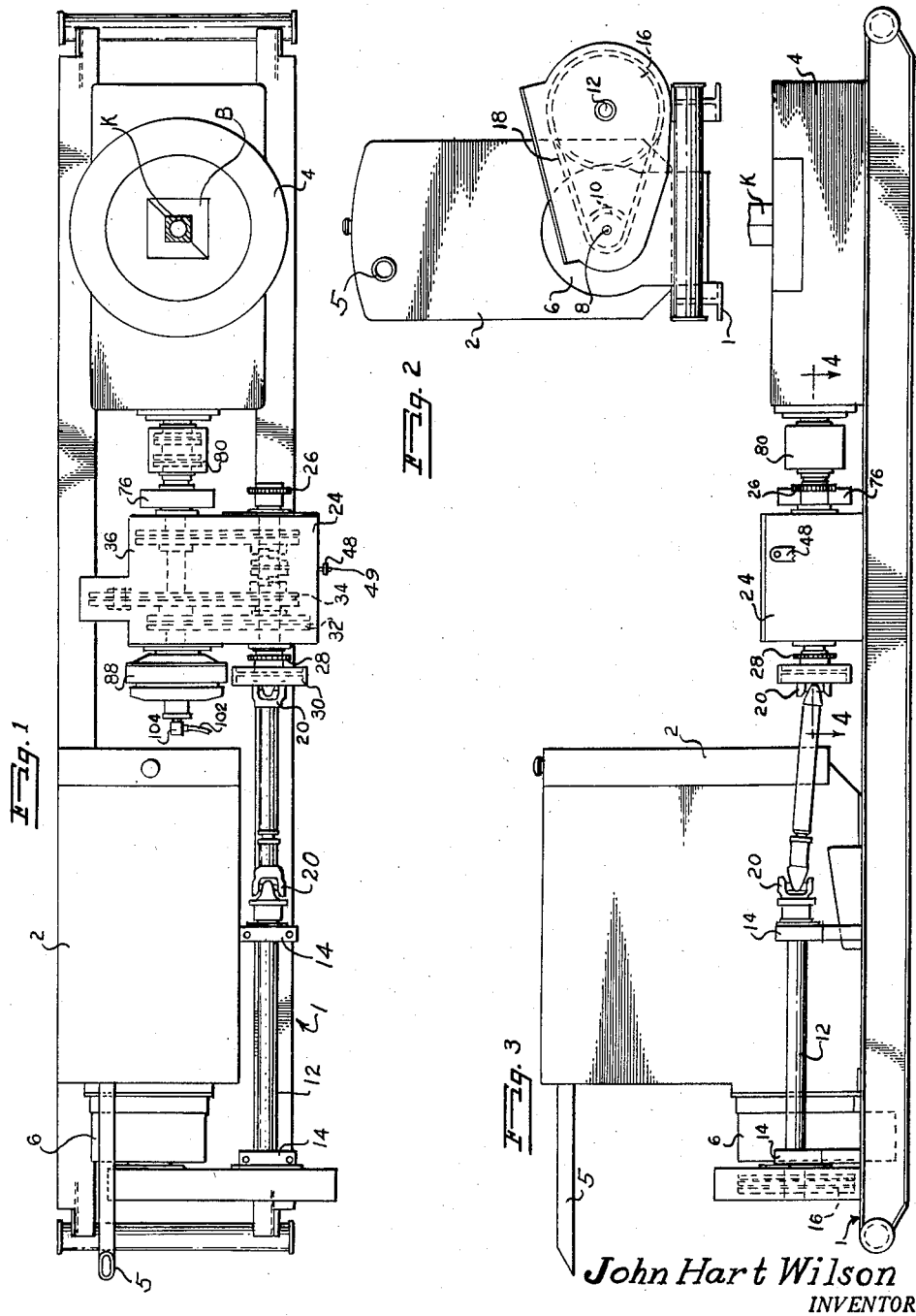
John Hart Wilson
INVENTOR.
BY
Watson, Cole, Grindle & Watson
ATTORNEYS Nov. 3, 1959
J. H. WILSON
2,911,193
INDIVIDUAL POWER DRIVE UNIT FOR ROTARY TABLES
Filed March 28, 1955
4 Sheets-Sheet 2
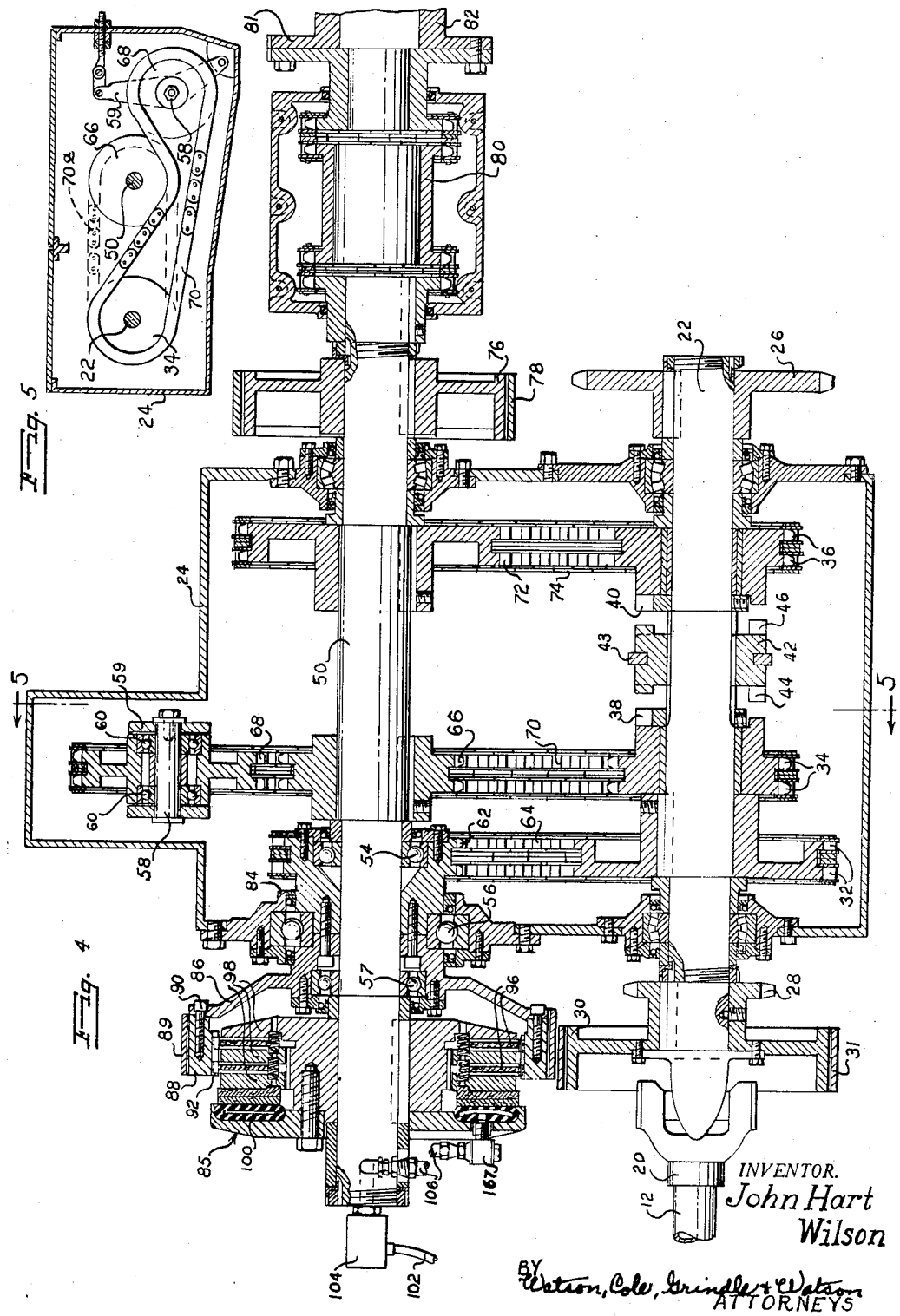
INVENTOR.
John Hart Wilson
BY Watson, Cole, Grindle & Watson
ATTORNEYS

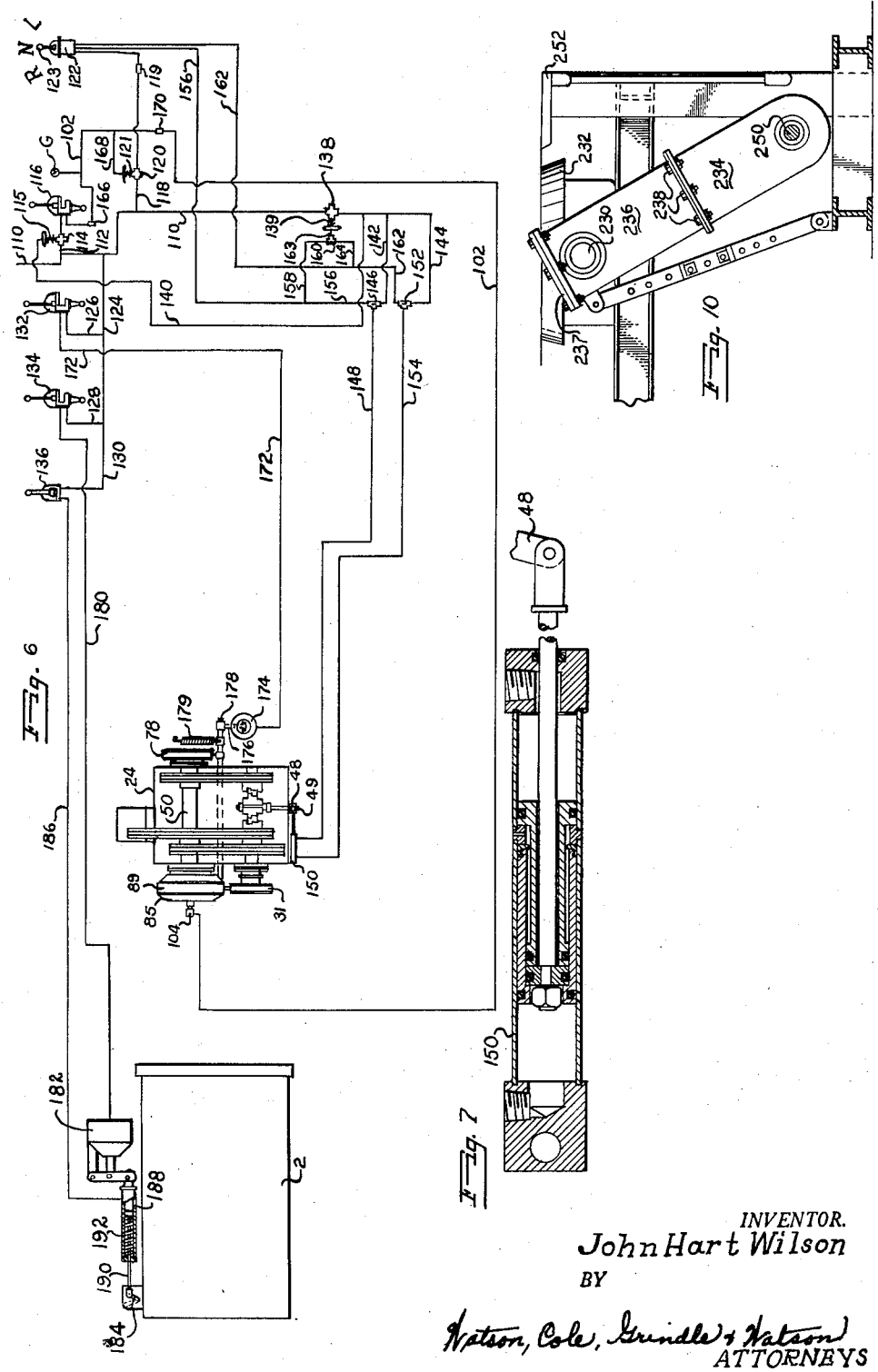

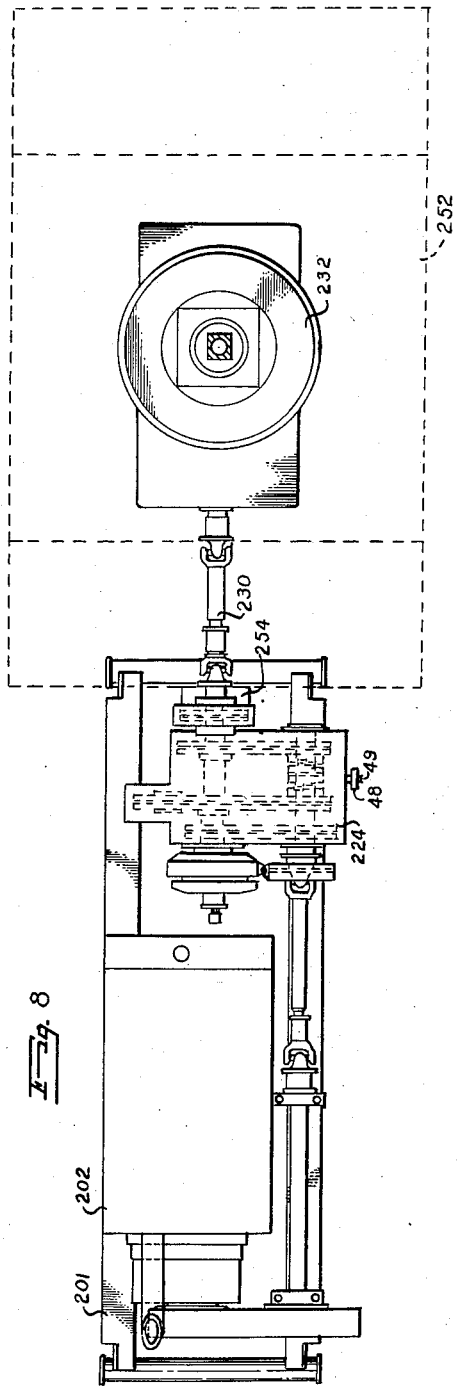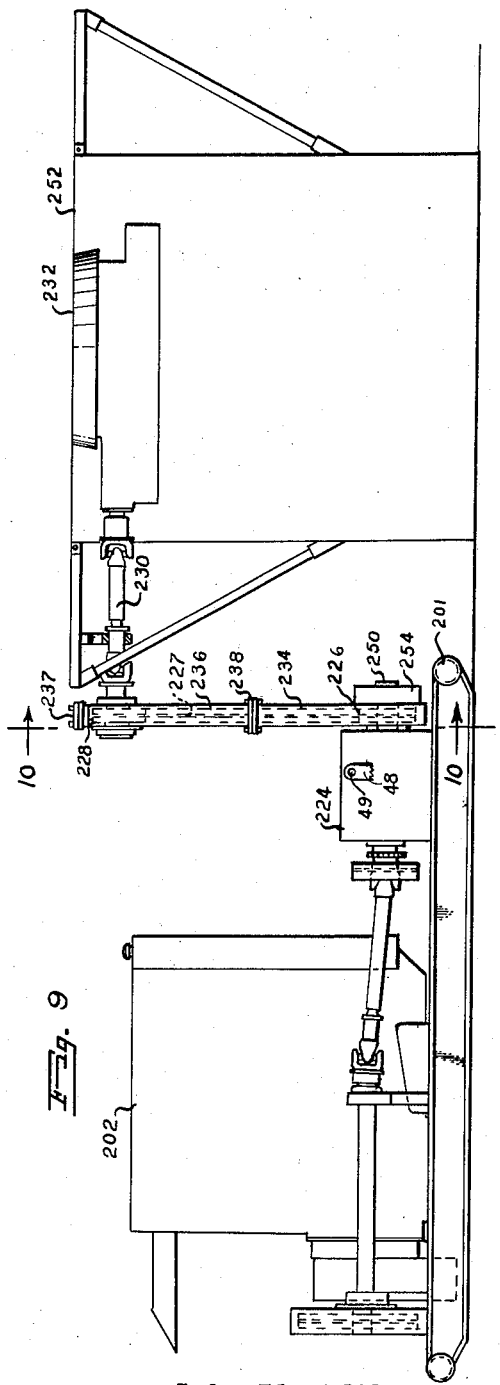

United States Patent Office 2,911,193
Patented Nov. 3, 1959

2,911,193

INDIVIDUAL POWER DRIVE UNIT FOR ROTARY TABLES

John Hart Wilson, Wichita Falls, Tex.

Application March 28, 1955, Serial No. 497,033

10 Claims. (Cl. 255—19)

This invention relates to improvements in drive mechanism for rotary tables.

Various rotary table drives have been proposed heretofore, but these, for the most part, were combined with other mechanisms, such as the draw works of a drilling rig and did not lend themselves to use as individual unit drive, as does the present device.

The present device is so designed as to enable the composite unit to be mounted on skid sills to occupy the minimum width and still supply power to the rotary drive table, both at high and low speeds, including a reverse drive for the rotary table.

An object of this invention is to provide a unitary rotary table drive which is self contained and which will supply power to a rotary table both at high and at low speeds, as well as in reverse.

Another object of this invention is to provide a positive drive for low speed and reverse of the rotary table and to supply an air actuated friction clutch for driving the rotary table at high speed.

Another object of this invention is to provide, in a rotary table drive, a rotary table transmission that is self contained on skid sills, with the axis of the engine in parallel driving relation with the axis of the pinion shaft of the rotary table.

Yet another object of this invention is to provide an independent rotary table drive which will relieve wear on the draw works.

A still further object of the invention is to provide a rotary table drive, wherein a friction clutch is provided to relieve the shock from high speed drilling, since the greater part of the drilling is done at high speed.

Another object of this invention is to provide a drive unit for a rotary table which is also adaptable for use with a power take-off, with a torque converter, or with a torque converter combined with a fluid coupling.

Yet another object of the invention is to provide a rotary table drive unit which is flexible in its application, that is, one which is usable with all ranges of engine speeds, simply by changing the sprocket on the engine, or the sprocket on the drive shaft, or both sprockets may be changed.

A further object of this invention is to provide a rotary table drive unit which will give the correct rotation to the rotary table, with the engine so positioned that the exhaust pipe thereof will be remote from the well.

A still further object of the invention is to provide a gear mechanism whereby a chain can be connected in driving relation so as to drive the rotary table in either forward or reverse, or at an intermediate speed.

Yet a further object of this invention is to provide a rotary table drive that is easy to assemble, to disassemble, which is simple and effective in construction and versatile in operation, as well as low in cost of manufacture.

Still another object of the invention is to provide a power unit and transmission which may be placed at one level to drive a rotary table which is at another level.

With these objects in mind and others that will manifest themselves as the description proceeds, reference is to be had to the accompanying drawings, in which like reference characters designate like parts in the several views thereof, in which:

Fig. 1 is to a top plan view of the rotary table drive unit, transmission, and rotary table mounted on skid sills;

Fig. 2 is an end view of the drive unit showing the engine and the chain housing mounted thereon and showing the drive chain in dotted outline;

Fig. 3 is a side elevational view of the rotary drive unit, as shown in Fig. 1;

Fig. 4 is an enlarged sectional view taken on the line 4—4 of Fig. 3, looking in the direction indicated by the arrows;

Fig. 5 is a sectional diagrammatic view taken on the line 5—5 of Fig. 4, looking in the direction indicated by the arrows, showing the chain in full outline, in position to drive the rotary table in reverse, and showing the chain in dotted outline to drive the rotary table in a forward intermediate speed;

Fig. 6 is a diagrammatic view of the air piping to the various mechanisms which are actuated by control valves at a remote point;

Fig. 7 is a fragmentary view of the transmission gear shift lever with a pneumatic cylinder and plunger attached thereto;

Fig. 8 is a view similar to Fig. 1, but of a modified form of the invention;

Fig. 9 is a view similar to Fig. 3 of the modified form of the invention;

Fig. 10 is a sectional view taken on the line 10—10 of Fig. 9, looking in the direction indicated by the arrows.

With more detailed reference to the drawing, the numeral 1 designates a frame or skid sills, with an engine 2 mounted longitudinally of the frame near the end remote from the well, and a rotary table 4 is mounted on the frame 1, near the other end thereof. The exhaust pipe 5 of engine 2 has its discharge end positioned at the end of the engine remote from the table and directed away from the table and the well.

The engine 2 preferably has a torque converter, or a combination torque converter and fluid coupling within the housing 6, which housing has a shaft 8 extending rearward therefrom on which a drive sprocket 10 is secured. A counter shaft 12 is journaled in bearings 14, which bearings are mounted on frame 1, parallel to the shaft 8. One end of the counter shaft 12 has a sprocket 16 thereon which is in driving alignment with sprocket 10 and a chain 18 passes around sprockets 10 and 16 so as to form a drive for counter shaft 12. The counter shaft 12 extends forward and drives through universal joints 20 to drive shaft 22 within transmission housing 24.

An auxiliary drive sprocket 26 is provided on shaft 22 so that the rotary table 4 may be driven from a sprocket on a jack shaft, counter shaft, or from a sprocket on any other shaft on the draw works, when it is desirable to dispense with the engine 2. In so doing all speeds of the transmission, which is generally designated at 24, may be had, thereby giving greater range of driving speeds to the rotary table 4.

A sprocket 28 is positioned on the opposite end of shaft 22, which may be driven through gearing to drive a cathead shaft, when so desired.

A brake drum 30 is provided on shaft 22 to enable the slowing or stopping of the shaft, as desired, through conventional brake band means 31.

The shaft 22 has a sprocket 32 fixedly secured thereto to rotate therewith and sprockets 34 and 36 are journaled thereon, each of which sprockets 34 and 36 have jaw clutches 38 and 40, respectively on adjacent ends in position to be complementarily engaged by slidable clutch member 42 having clutch jaws 44 and 46 on the respective opposite ends to complementarily engage either jaws 38 on sprocket 34 or clutch jaws 40 on sprocket 36. The slidable clutch member 42 is in sliding, splined engagement with shaft 22 and may be selectively engaged with either the clutch jaws 38 or the clutch jaws 40 by movement of the clutch lever 48 so as to drive either the sprockets 34 or the sprockets 36.

A shaft 50 is journaled within housing 24 on bearings 52, 54, 56, and 57, and a shaft 58 is non-rotatably secured in upstanding lugs 59 and sprocket 68 is journaled on bearings 60 within housing 24. The shafts 50 and 58 are parallel with respect to shaft 22. The shaft 50 has a sprocket 62 journaled thereon in driving alignment with sprocket 32. A chain 64 passes around sprockets 32 and 62 to connect these sprockets in driving relation. A sprocket 66 is fixedly secured on shaft 50 and is in alignment with sprocket 34 on shaft 22 and sprocket 68 journaled on shaft 58. A drive chain 70 normally passes around sprockets 34 and 68, and the upper reach of the chain 70 passes below sprockets 66 on shaft 50, so as to normally reverse the drive of the sprocket 66 and shaft 50 with respect to the rotation of the shaft 22. The chain 64 may be disconnected and removed from around sprockets 34 and 68, shortened and reconnected so as to surround sprockets 34 and 66 so as to drive shaft 50 at an intermediate speed in a forward direction, or in the same direction as shaft 22, thereby giving a three-speed forward driving range of the rotary table.

A sprocket 72 is fixedly secured to shaft 50 in driving alignment with sprocket 36 and a chain 74 passes around sprockets 36 and 72 to rotate shaft 50 in the same direction as shaft 22 is rotated, but normally at a slower speed.

A brake drum 76 is fixedly secured to shaft 50 for slowing the movement of the shaft or holding it against rotation. A brake band 78, of the contracting type, may be utilized to engage brake drum 76. The shaft 50 extends forward and connects with a coupling 80 so as to provide proper alignment of the shaft 50 with the flange 81 on the pinion drive shaft 82 of the rotary table 4, so as to drive the rotary table. The rotary table 4 is of the conventional type having a pinion shaft 82 which drives a bevel pinion to drive a bevel gear within the rotary table in a manner well understood in the art.

The sprocket 62 is mounted on a hub 84 on shaft 50, which hub carries an air actuated clutch designated generally at 85. The hub 84 is journaled on bearings 54, 56 and 57. The hub 84 has an outwardly extending flange 86 exterior and to the rear of transmission housing 24, which flange connects with a toothed ring 88 by means of bolts 90. The external teeth of ring 88 engage the peripheral teeth 94 of the clutch discs 96. The clutch discs 96 are axially engaged by the complementary faces of the clutch disc plates 98, upon expansion of clutch tube 100, which is pneumatically actuated by air pressure introduced through conduit 102, rotary seal 104, and conduit 106, as will be more fully brought out hereinafter.

An air supply pipe 110 leads from a suitable source of high pressure air, such as a compressor tank or the like, and has branches 112 leading to the diaphragm actuated valve 114, to a high speed control valve 116. A second branch pipe 118 leads through diaphragm actuated valve 120, through check and metering valve 119 to one side of a low speed, reverse or neutral control valve 122. Another pipe 124 is connected to pipe 110 and has branch pipes 126, 128 and 130 connected thereto, which lead respectively to brake control valve 132, throttle control valve 134 and engine "kill" valve 136. The pipe 110 extends further through a diaphragm actuated valve 138 and has branch pipes 140, 142, and 144 connected thereto. Pipe 140 connects to a diaphragm chamber of diaphragm valve 114 so as to open the valve against tension of spring 115, which valve will normally close upon release of air pressure from diaphragm chamber of valve 114. The pipe 142 connects through two-way check valve 146 with pipe 148 which leads to one side of three-position pneumatic cylinder 150. The pipe 144 leads through a two-way check valve 152 to pipe 154 to the other side of three-position pneumatic cylinder 150. The two-way check valve 146 also connects through a conduit 156 to valve 152 and to a conduit 158 which leads to and through a two-way check valve 160, which connects with a conduit 162 leading to the diaphragm chamber of diaphragm valve 138, so upon application of pressure, the valve 138 will be closed against tension of spring 139. The two-way check valve 152 also has a branch pipe 162 leading therefrom which connects to a reverse, neutral and low valve 122.

A branch pipe 164 connects pipe 162 to the other side of two-way check valve 160. A pipe 102 leads from high speed control valve 116 through a quick release valve 166, and has a branch pipe 168 leading to the diaphragm chamber of control valve 120 so as to apply pressure to close the valve against tension of spring 121. The pipe 102 passes through a metering and check valve 170 to a rotary fluid seal 104 to expand tube 100 to cause engagement of the clutch 85.

A pipe 172 leads from brake control valve 132 to an air actuator 174 to provide pressure to move lever 176 to rotate brake shaft 178 against tension of spring 179, which rotation applies simultaneous braking action to brake bands 31, 78 and 89. A pipe 180 leads from valve 134 to an air actuator 182 so as to move throttle lever 184 back and forth in accordance with the lever of valve 134, as the valve is of the character that, upon moving the lever in one direction, pressure is applied, and upon moving the lever in the opposite direction, air is bled from the valve in proportion to the movement of the lever. The valve 132 functions in a similar manner.

A pipe 186 leads from valve 136 to a one-way pneumatic cylinder 188 which moves the plunger 190 outward upon application of pressure against tension of spring 192, so upon return movement of the lever of valve 136, air is bled from the cylinder, which will permit the return of plunger 190 under influence of spring 192.

*Operation of first form of invention*

The present unit is self contained and may be operated independently of the draw works and may be moved into place on the derrick floor and the air controls connected thereto so the rotary table drive may be operated from the driller's position.

With the form of invention as shown in Figs. 1 through 7, the entire unit may be quickly adjusted into position and connected up ready for operation, and with the Kelly joint K positioned through the rotary table 4 and in driving relation with bushing B, and with a suitable drill bit on the lower end thereof, or on the stem connected thereto, the device is ready to operate. With the air released from the brakes by movement of lever of brake control valve 132 to released position, a gear is selected, such as low, high, or reverse, and by moving the lever of valve 136 to released position of the throttle kill valve, the plunger 190 will be retracted by spring 192 so as to enable throttle lever 184 to be actuated by movement of cylinder 188 by the actuator 182. With the cylinder in this position, the lever of throttle valve 134 is moved to supply air to the actuator 182 to move the throttle 184 to the desired position. With the throttle in this position, the engine clutch or torque convertor within housing 6, will furnish torque through drive shaft 8 and chain 18 to drive sprocket 16 and counter shaft 12 which connects with the gearing within transmission housing 24.

If it is desired to put the transmission in low gear, the lever 123 is moved to a position as indicated at L, whereupon the air from supply pipe 110 passes into branch pipe 118 through valve 120 through check and metering valve 119 into valve 122, thence through pipe 162 to and through two-way check valve 152 into pipe 154 to cylinder 150 to move the plunger thereof to fully extended position, whereupon, the lever 48 rotates shaft 49 to cause clutch yoke 43 to move the jaw clutch member 42 to the left to engage clutch 40, whereupon, the counter shaft 12 will be connected through shaft 22, sprocket 36 and chain 74 in driving relation with sprocket 72 which is fixedly secured to shaft 50. At the same time, air is being applied to this cylinder, air is also being supplied through branch pipe 164 through two-way check valve 160 through pipe 163 to apply pressure to the diaphragm in diaphragm chamber of valve 138 so as to close this valve and the air supply leading to the reverse side of the cylinder. With the closing of this pipe, pipes 140, 142 and 144 will be bled of any pressure therein. Upon the bleeding of air from pipe 144, the pressure is released from diaphragm of diaphragm valve 114, whereupon the spring 115 moves the diaphragm upward and closes the valve 114 within air supply pipe 112 leading to high speed control valve 116.

When it is desired to change speed from low to some other gear, the lever of valve 122 is moved into neutral, whereupon air will be bled from pipe 162 and pipe 164 by valve 122. Upon valve 138 opening, the air will be directed from supply pipe 110 simultaneously into branch pipe 144 through two-way check valve 146 into pipe 148 to the other end of cylinder 150, whereupon, the plunger of cylinder 150 will move lever 48 into midposition, the air will be directed simultaneously into pipe 140 to act on the diaphragm of diaphragm valve 114 to press the diaphragm down and open valve 144 in air supply pipe leading to high speed control valve 116.

Then, if it is desired to shift into high gear, the lever of valve 116 is moved into position to direct air from pipe 112 into pipe 102, whereupon, the pressure immediately acts upon the diaphragm of diaphragm actuated valve 120 to close the air supply leading to valve 122. This acts as a safety factor to prevent the shifting of the clutch into either low or reverse, even though the lever of valve 122 might be moved. The closing of the valve 116 prevents further air from entering the valve 122 through pipe 118 and bleeds the air from the pipe 162 to a point of connection with the two-way check valve 152.

With the air being directed through valve 116, the air pressure will close quick release valve 166 and apply pressure through rotary seal 104 to axially expand clutch tube 100 to cause engagement of clutch plates 93 with friction plate member 96. Whereupon the shaft 50 is driven in direct connection with the pinion shaft 82 of the rotary table.

When it is desired to shift from high gear to another gear, such as reverse, the high gear lever is moved to neutral position, which in turn, will release air from the valve itself and the lessening of pressure on pipes 102 will cause quick release valves 166 and 167 to move to a position to release the air from the clutch and the pipe at the respective points. With the lever in neutral position, the lever of valve 122 may be moved into reverse position, whereupon, air from supply pipe 110 will be directed through pipe 118 through valve 120, check and metering valve 119 through valve 122 into pipe 156 to and through two-way check valve 146 into pipe 148 leading to the plunger end of cylinder 150. Upon application of pressure the pistons within the cylinder 150 will be moved to the extreme left position which will rotate shaft 49 to move clutch shifter yoke 43 and clutch 42 so that the jaws 44 thereof will engage jaws 38 to cause a driving action between sprockets 34 and 68 with one reach of the chain passing beneath sprocket 66 so as to drive sprocket 66 and sprocket 50 in reverse direction with respect to shaft 22. Simultaneously with the application of air to pipes 154 and 148, air pressure is applied through pipe 158 to two-way check valve 160 to act upon diaphragm of diaphragm control valve 138 to close the valve against tension of spring 139. When the valve is closed, it will bleed the pressure from pipe 144 and close pipe 110 at this point, and also bleed the air out of pipe 140. Upon release of pressure from diaphragm of diaphragm valve 114, the spring 115 will move the diaphragm upward, which will close pipe 112 leading to valve 116, thereby making this valve inoperative, and also preventing the engagement of high gear at the same time as the engagement of reverse gear.

Should the chain 70 be changed within the transmission housing 24, to the position as indicated in dashed outline in Fig. 5, the position of valve lever 123, as indicated at R, will then become a position to shift to an intermediate gear, and in so doing all valve operations, as indicated for reverse, will apply to this position, however, the clutch jaws 38 and 43, when engaged, will drive in intermediate gear.

It is to be pointed out, that with this particular arrangement of the valves, the shifting into two gears may not be accomplished, as the interlocking arrangement between the diaphragm valve and the control valves is such that when valve 114 is shifted into high, or valve 122 is shifted into low or reverse, the air to the other control valve will be automatically cut off and the air bled from the line from which the air is cut off, so that the respective air actuated elements which shift the gears will be permitted to function against back pressure.

Modified form of invention

In the form of the invention, as shown in Figs. 8, 9, and 10, a skid sill or frame 201 is provided on which a power unit 202 is mounted at one end of the frame 201, which power unit has a torque convertor or a clutch within a housing adjacent the power unit, which has a shaft extending outward therefrom, such as the shaft 8 in the form of the invention as shown in Figs. 1 through 3, which drives a counter shaft similar to the counter shaft 12 in the manner as set out in the aforementioned form of invention. A transmission 224 has a sprocket 226 on the driven shaft 250 and a sprocket 228 is positioned on the outwardly extending shaft 230 which connects with the pinion shaft of the rotary table 232.

A lower chain housing case 234 and an upper chain housing case 236 are flanged and bolted together by means of bolts 238, as indicated in Fig. 9, and the sprocket 228 and shaft 230 are journaled at the upper end of the housing 236 and which housing is adapted to pivot on the bearings about the axis of shaft 230. The housing 236 is covered by a plate 237 to permit the connection of chain 227 which surrounds the sprockets 226 and 228. The lower end of the housing 234 is journaled for turning action about the shaft 250 which extends outward from transmission 224. In this manner the power unit 202, skid sills 201 and transmission 224 may be located on the ground or a substantial distance below the work surface of the sub-structure 252, and furthermore, by having the skid sills the power unit, and transmission in one unit and the rotary table in a separate unit, makes it possible to disconnect bolts 238 and to separate chain 240, which will make possible the moving of the units separately. The engine and transmission unit may be located so that the axis of the transmission drive shaft 250 and the rotary table shaft 230 may be in a vertical plane, or the engine and transmission may be moved in an arc around the shaft 230 and located at any level desired, so as to drive the rotary table through shaft 230.

A brake drum 254 may be positioned on shaft 250 in a manner similar to the positioning of brake drum 76 on shaft 50, as shown in Fig. 4.

The various gears within the transmission 224 are operated by the pneumatic control system as shown in Fig. 6.

The operation of this form of the invention is the same as that of the aforementioned and described form, however, this form of invention may be readily used with an elevated sub-structure without having to elevate the power unit and transmission to a higher level.

Having thus described the invention, what is claimed is:

1. In a drive mechanism for a rotary table, a frame, an internal combustion engine mounted on said frame near an end thereof, said engine having a drive shaft, a rotary table mounted on said frame near the other end thereof, said rotary table having a pinion shaft extending along said frame toward said engine, a change gear transmission mounted on said frame intermediate said engine and said rotary table, said transmission having driving and driven shafts extending outwardly from opposite ends thereof, said pinion shaft of said rotary table being connected in driving relation with the driven shaft of said transmission, said engine, transmission and rotary table being relatively aligned on said frame in a given direction, the drive shaft of said engine extending outwardly from the engine in said direction, on the side of said engine remote from said rotary table, a counter-shaft journaled on said engine along a side thereof, which counter-shaft is substantially parallel with the drive shaft of said engine, said counter-shaft having one end connected in driving relation with the driving shaft of said transmission, the other end thereof being connected by gearing to the drive shaft of said engine, clutch means included in said transmission for selectively actuating said transmission to transmit different ratios of speed from said engine to said rotary table, fluid actuator means for controlling and actuating said clutch means, and valve means for directing fluid under pressure to said fluid actuator means.

2. The device substantially as set forth in claim 1, wherein; said clutch means comprises one friction clutch and one positive clutch.

3. The device substantially as set forth in claim 1, wherein; said clutch means comprises a positive clutch disposed so as to drive said rotary table in either direction, and a fluid actuated clutch to drive said rotary table at high speed in one direction.

4. The device substantially as set forth in claim 3, wherein; two-way check valves are located within certain fluid supply lines leading to said clutches, whereby fluid under pressure can be selectively directed to an actuator to cause engagement of only one clutch.

5. The device substantially as set forth in claim 1, wherein; said clutch means comprises a pair of positive clutches which are mounted within said transmission to drive said rotary table at a low speed in either direction, and wherein a fluid actuated clutch is connected in friction relation to said transmission to drive said rotary table at high speed in one direction.

6. The device substantially as set forth in claim 1, wherein; a reverse gearing mechanism in said transmission may be changed to drive in a forward direction at an intermediate speed.

7. The device substantially as set forth in claim 1, wherein; an auxiliary drive sprocket is fixedly secured to one of said transmission shafts to enable accessory power to be transmitted, at selected speeds, through said transmission to said rotary table.

8. The device substantially as set forth in claim 1, wherein said engine includes an exhaust pipe having its discharge end positioned at the end of the engine remote from said rotary table and directed away from the table.

9. In the arrangement of a drive mechanism for a rotary table, a transmission and an internal combustion engine, a frame, said rotary table having a pinion shaft, which rotary table is mounted near one end of said frame, said engine being mounted on said frame at the other end thereof and having an exhaust pipe extending and discharging exhaust gases in a direction away from said table, a transmission having input and output shafts thereon, which transmission is mounted on said frame intermediate said rotary table and said engine, said rotary table having the pinion shaft thereof turned toward said transmission, said engine having the power output shaft thereof located at the end of the engine remote from the said rotary table and transmission, a countershaft mounted at the side of said engine in parallel relation therewith, drive means interconnecting the power output shaft of said engine and said countershaft in driving relation, a universal joint assembly connecting said countershaft and the input shaft of said transmission in driving relation, said output shaft of said transmission being in aligned relation with said pinion shaft of the rotary table, and coupling means between said output shaft and said pinion shaft of said rotary table.

10. The drive mechanism as defined in claim 9, wherein said transmission has at least two speeds, one of which speeds is driven by a friction clutch drive in which the clutch is located on a shaft mounted outside the case of said transmission, said friction clutch drive being through a sleeve which sleeve surrounds the friction clutch shaft and drives through a bearing so as to connect said clutch and a gear element in said transmission in driving relation, when said friction clutch is engaged, at least one other forward speed having a positive clutch mounted on a shaft and engageable with gearing in said transmission to obtain said other speed, said output shaft having a brake drum thereon, a brake engaging element cooperable with said brake drum to lock said output shaft, and said input shaft having a brake drum thereon and a cooperable brake element for braking said input shaft so as to enable the retarding of said shaft on which said positive clutch is located to enable the shifting of said positive clutch.

References Cited in the file of this patent
UNITED STATES PATENTS

| | | |
|---|---|---|
| 1,511,433 | Spowart | Oct. 14, 1924 |
| 1,741,140 | Pennington | Dec. 24, 1929 |
| 1,808,222 | Hild | June 2, 1931 |
| 2,094,313 | Wickman | Sept. 28, 1937 |
| 2,115,297 | Brantly et al. | Apr. 26, 1938 |
| 2,534,628 | Shacklette | Dec. 19, 1950 |